US012739218B2

(12) United States Patent
Jiang et al.

(10) Patent No.: US 12,739,218 B2
(45) Date of Patent: Sep. 15, 2026

(54) METHODS, APPARATUSES, SYSTEMS AND STORAGE MEDIA FOR PROCESSING A LINK IN A CONVERSATION

(71) Applicant: Beijing Zitiao Network Technology Co., Ltd., Beijing (CN)

(72) Inventors: Yan Jiang, Beijing (CN); Hongye Qi, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 198 days.

(21) Appl. No.: 18/573,912

(22) PCT Filed: Aug. 29, 2022

(86) PCT No.: PCT/CN2022/115518
§ 371 (c)(1),
(2) Date: Dec. 22, 2023

(87) PCT Pub. No.: WO2023/025322
PCT Pub. Date: Mar. 2, 2023

(65) Prior Publication Data

US 2024/0214340 A1 Jun. 27, 2024

(30) Foreign Application Priority Data

Aug. 27, 2021 (CN) ......................... 202110996521.7

(51) Int. Cl.
*H04L 51/18* (2022.01)
*G06F 3/04842* (2022.01)
(Continued)

(52) U.S. Cl.
CPC .......... *H04L 51/18* (2013.01); *G06F 3/04842* (2013.01); *G06F 40/134* (2020.01); *H04L 51/046* (2013.01); *H04L 51/216* (2022.05)

(58) Field of Classification Search
CPC ..... H04L 51/18; H04L 51/046; H04L 51/216; H04L 51/04; G06F 3/04842; G06F 40/134; G06F 16/9558; G06F 9/451
See application file for complete search history.

(56) References Cited

U.S. PATENT DOCUMENTS 11,580,592 B2 * 2/2023 Berger .................. G06T 19/006
2014/0181697 A1 6/2014 Kirigin
(Continued)

FOREIGN PATENT DOCUMENTS

CN 102542031 A 7/2012
CN 106254216 A 12/2016
(Continued)

OTHER PUBLICATIONS

International Search Report and Written Opinion, PCT application No. PCT/CN2022/115518, Nov. 16, 2022, with English translation of Search Report (8 pages).
(Continued)

*Primary Examiner* — Cao H Nguyen
(74) *Attorney, Agent, or Firm* — Astute IP Law Group

(57) ABSTRACT

Embodiments of the disclosure relate to a method, apparatus, system and storage medium for processing a link in a conversation. In at least one embodiment of the disclosure, for a message containing a link sent in an instant messaging conversation, a message card itself is enabled to support storage function and a user is enabled to trigger a first storage control in the message card in turn by displaying the message card including the first storage control in an interface of the instant messaging conversation. A link object corresponding to the link is stored thereby in responding to the user's operation for trigger the first storage control. The user can directly store link content of the link in an instant messaging tool by triggering the first storage control, with-
(Continued)

out clicking on the link or clicking on a title to jump to a main body for storage.

20 Claims, 3 Drawing Sheets

(51) Int. Cl.

| | |
|---|---|
| ***G06F 40/134*** | (2020.01) |
| ***H04L 51/046*** | (2022.01) |
| ***H04L 51/216*** | (2022.01) |

(56) References Cited

U.S. PATENT DOCUMENTS

| | | | | |
|---|---|---|---|---|
| 2022/0114230 | A1* | 4/2022 | Corley | G06F 16/9558 |
| 2023/0333729 | A1* | 10/2023 | Lin | G06F 3/04817 |

FOREIGN PATENT DOCUMENTS

| | | | | |
|---|---|---|---|---|
| CN | 107657045 | A | | 2/2018 |
| CN | 10795961 | | * | 4/2018 |
| CN | 107959615 | A | | 4/2018 |
| CN | 108259529 | A | | 7/2018 |
| CN | 110875868 | A | | 3/2020 |
| CN | 113127432 | A | | 7/2021 |

OTHER PUBLICATIONS

Office Action received for Chinese Patent Application No. 202110996521.7, mailed on Apr. 2, 2025, 22 pages (11 pages of English Translation and 11 pages of Original Document).

* cited by examiner

Figure 1:
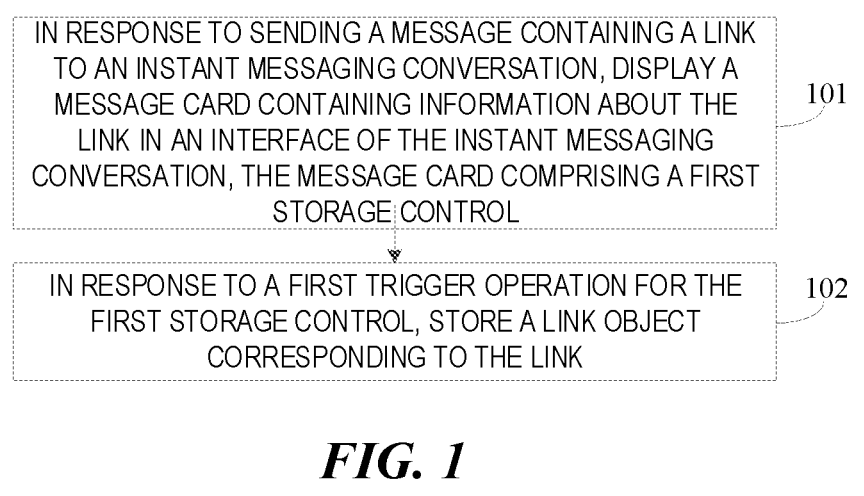

IN RESPONSE TO SENDING A MESSAGE CONTAINING A LINK TO AN INSTANT MESSAGING CONVERSATION, DISPLAY A MESSAGE CARD CONTAINING INFORMATION ABOUT THE LINK IN AN INTERFACE OF THE INSTANT MESSAGING CONVERSATION, THE MESSAGE CARD COMPRISING A FIRST STORAGE CONTROL

101

IN RESPONSE TO A FIRST TRIGGER OPERATION FOR THE FIRST STORAGE CONTROL, STORE A LINK OBJECT CORRESPONDING TO THE LINK

METHODS, APPARATUSES, SYSTEMS AND STORAGE MEDIA FOR PROCESSING A LINK IN A CONVERSATION

CROSS REFERENCE

The present application claims priority to Chinese Patent Application No. 202110996521.7, entitled "METHODS, APPARATUSES, SYSTEMS AND STORAGE MEDIA FOR PROCESSING A LINK IN A CONVERSATION" filed on Aug. 27, 2021, the content of which are hereby incorporated by reference in its entirety.

FIELD

Embodiments of the present disclosure relate to the field of instant messaging technologies, and specifically relate to a method, apparatus, system, and storage medium for processing a link in a conversation.

BACKGROUND

Currently, for a text-based link (Uniform Resource Locator, URL) sent in an instant messaging conversation, such as an official account link, a news webpage link, etc., a URL is usually directly displayed in a interface of the instant messaging conversations or only a title or a part of a link content is displayed while displaying the URL in different instant messaging (IM) tools.

Users usually store valuable content they browse. However, in current instant messaging tools, users can only see a title or a part of a link content before clicking on a URL to jump to the main body. If a user want to learn more content, he/she needs to click on the URL or click on the title to jump to an original page linked by the URL to view the main body, and then the main body can be stored, resulting in low content consumption efficiency.

SUMMARY

In order to solve at least one problem with the prior technologies, at least one embodiment of the present disclosure provides a method, apparatus, system, and storage medium for processing a link in a conversation.

In a first aspect, embodiments of the present disclosure provide a method for processing a link in a conversation, comprising:

- in response to sending a message containing a link to an instant messaging conversation, displaying a message card containing information about the link in an interface of the instant messaging conversation, the message card comprising a first storage control; and
- rendering the message card comprising the information about the link and the first storage control.

In a second aspect, embodiments of the present disclosure propose an apparatus for processing a link in a conversation, comprising:

- a display unit configured to display, in response to sending a message containing a link to an instant messaging conversation, a message card containing information about the link in an interface of the instant messaging conversation, the message card comprising a first storage control; and
- a processing unit configured to store a link object corresponding to the link in response to a first trigger operation for the first storage control.

In a third aspect, embodiments of the present disclosure further propose a system comprising at least one computing device and at least one storage device storing instructions, wherein the instructions, when executed by the at least one computing device, cause the at least one computing device to perform the steps of the method for processing a link in a conversation of any embodiment of the first aspect.

In a fourth aspect, embodiments of the present disclosure further proposes a computer-readable storage medium, which stores programs or instructions that, when executed by at least one computing device, cause the at least one computing device to perform the steps of the method for processing a link in a conversation of any embodiment of the first aspect.

It can be seen that in at least one embodiment of the present disclosure, for the message containing the link (i.e. URL) sent in the instant messaging conversation, the message card comprising the first storage control is displayed in the interface of the instant messaging conversation, so that the message card itself supports storage function and the user can in turn trigger the first storage control in the message card. A link object (i.e. link content) of the link is stored thereby in responding to the user's trigger operation for the first storage control. It can be seen that the user can directly store the link content of the URL in the instant messaging tool by triggering the first storage control of the message card, without clicking on the URL or clicking on the title to jump to the main body for storage, which can improve content consumption efficiency and facilitate message circulation between different suites.

BRIEF DESCRIPTION OF DRAWINGS

In order to more clearly illustrate the technical solution of the embodiments of the present disclosure, the following will briefly introduce the drawings required for the embodiments or prior art. Obviously, the drawings described below are only some embodiments of the present disclosure, and ordinary skill in the art can also obtain other drawings based on these drawings.

FIG. 1 is an example flowchart of a method for processing a link in a conversation provided in an embodiment of the present disclosure.

DETAILED DESCRIPTION

Figure 2:
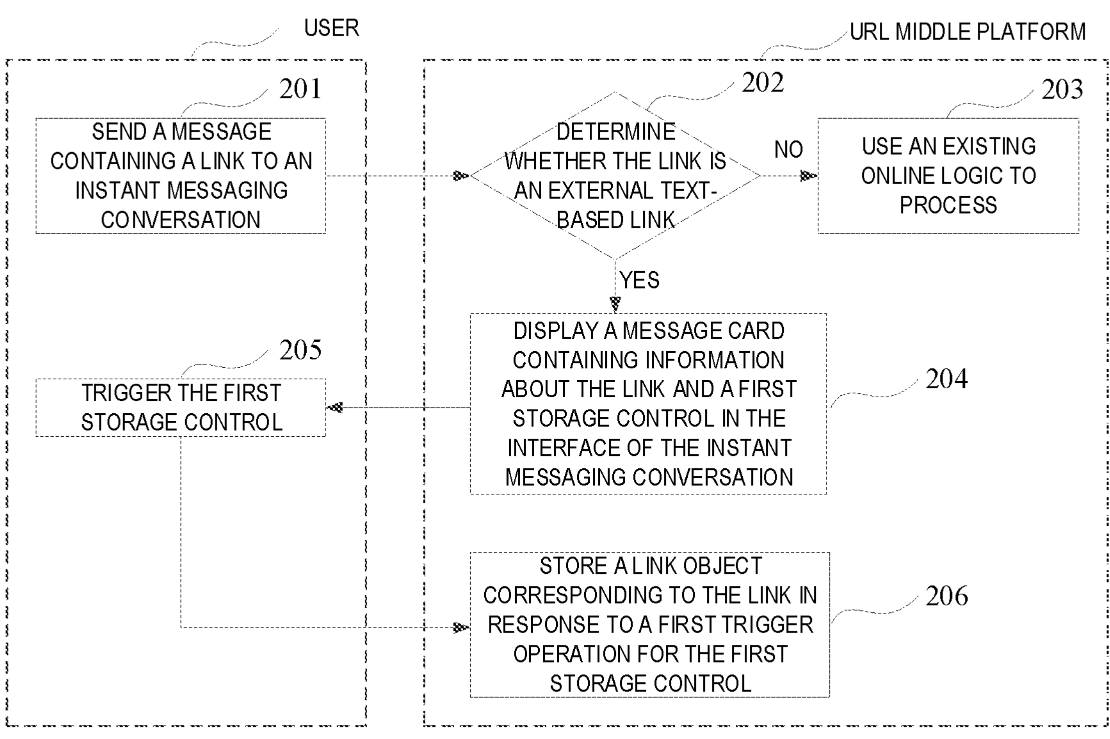
FIG. 2 is an example flowchart of another method for processing a link in a conversation provided in an embodiment of the present disclosure.

In order to have a clearer understanding of the above purposes, features, and advantages of the present disclosure, the following will provide further detailed explanations of the present disclosure in conjunction with the accompanying drawings and embodiments. It can be understood that the described embodiments are a portion of the embodiments disclosed in the present disclosure, rather than all of them. The specific embodiments described herein are only intended to explain the present disclosure and not to limit it. Based on the described embodiments of the present disclosure, all other embodiments obtained by ordinary skill in the art fall within the scope claimed in the present disclosure.

It should be noted that in this description, relational terms such as "first" and "second" are only used to distinguish one entity or operation from another entity or operation, and do not necessarily require or imply any actual relationship or order between these entities or operations.

In messaging scenarios, messages are usually sent in instant messaging conversations. From the perspective of interoperability between different functional suites, IM messages can be sent to other application scenarios within a suite in the form of messages forwarded outside of the conversations, enhancing the circulation of messages between different suites and lowing the bar for message transmission.

A text-based links refers to a link with text as a main link content (Uniform Resource Locator, URL), such as a content platform, a forum link, an official account link, a news webpage link, etc. Currently, different instant messaging tools have different processing modes for a text-based external link sent in an instant messaging conversation, such as:

In some instant messaging tools, a URL is directly displayed, and users can click on the URL to jump to an original page linked by the URL for viewing. In some instant messaging tools, a message card comprising the URL can be rendered, which can provide a part of link content. The message card itself does not support click-to-jump or storage. If users want to learn more content, they can only jump to the main body by clicking on the URL for viewing. In some other instant messaging tools, the URL can be parsed to obtain a title, and the message card comprising the URL and the title can be rendered. The message card itself does not support click-to-jump or storage, and users can click on the URL or the title to jump to the main body for viewing.

It can be seen that a user cannot directly store the link content of the URL in instant messaging tools and he/she needs to click on the URL or click on the title to jump to the main body for viewing, and then the main body can be stored, which reduces content consumption efficiency and is not conducive to circulation of messages between different suites.

The embodiments of the present disclosure provide a method, apparatus, system, and storage medium for processing a link in a conversation. For a message containing a link (i.e. URL) sent in an instant messaging conversation, a message card comprising a first storage control is displayed in a interface of the instant messaging conversation, so that the message card itself supports storage function and a user can in turn trigger the first storage control in the message card. A link object (i.e. link content) of the link is stored thereby in responding to the user's trigger operation for the first storage control. It can be seen that the user can directly store the link content of the URL in the instant messaging tool by triggering the first storage control of the message card, without clicking on the URL or clicking on the title to jump to the main body for storage, which can improve content consumption efficiency and facilitate message circulation between different suites.

In other embodiments, for a message containing a link sent in an instant messaging conversation, a message card comprising a preview control is displayed in a interface of the instant messaging conversation, so that the message card itself supports preview function and the user can in turn trigger the preview control in the message card. Preview information of a link object corresponding to the link is stored thereby in responding to the user's trigger operation for the preview control. It can be seen that if the user wants to know more content, he/she can view the preview information by triggering the preview control, without clicking on the link or a title to jump to the main body for viewing, making it more convenient for the user to understand more content. Even if the title or a part of the link content does not attract the user's attention, the user may trigger the preview control to view the preview information due to the existence of the preview control, which increases the exposure of the link content.

FIG. 1 is an example flowchart of a method for processing a link in a conversation provided in an embodiment of the present disclosure. The method for processing a link in a conversation may include but is not limited to the following step 101 and step 102:

101: in response to sending a message containing a link to an instant messaging conversation, displaying a message card containing information about the link in an interface of the instant messaging conversation, the message card comprising a first storage control.

The link herein is a text-based link, that is, a link with text as a main link content (Uniform Resource Locator, URL), such as a content platform link, a forum link, an official account links a news web link, etc.

In some embodiments, the first storage control may be added in a fixed area of the message card as a storage entrance, wherein the first storage control is, for example, a "store" button.

102: in response to a first trigger operation for the first storage control, storing a link object corresponding to the link. The link object herein is a webpage corresponding to the link and the first trigger operation is, for example, clicking the left button on a mouse.

In some embodiments, storing a link object comprises saving a first document containing the link object to a first storage directory or a root directory of a predetermined storage space. The predetermined storage space herein is a storage space for saving cloud files in the instant messaging tool, and the first document belongs to a type of cloud file. In addition, there is an entrance to access the predetermined storage space in a user interface of the instant messaging tool. In some embodiments, the first storage control can be referred to as a clip and storage control. After the first trigger operation is performed on the clipping control, the link object corresponding to the link is clipped and stored, that is, the content of the link object is saved in a specified document after it is clipped.

In some embodiments, if the storage location is the first storage directory of the predetermined storage space, a determination is made as to whether the first storage directory exists in the predetermined storage space when the first document containing the link object is successfully stored. If the first storage directory exists in the predetermined storage space, the first document can be directly saved in the first storage directory. If the first storage directory does not exist in the predetermined storage space, the first storage directory is created in the predetermined storage space first, and then the first document is saved in the first storage directory.

It should be noted that only one first storage directory can exist in the predetermined storage space, that is, if the storage location is the first storage directory of the predetermined storage space, different first documents obtained by storing link objects corresponding to different links are all saved in the same first storage directory.

In some embodiments, while the link object is being stored, a message prompt box is popped up and storage progress information is displayed in the message prompt box, such as "being stored . . . X %", where X is any positive number between 0 and 100, and X is dynamically updated with the storage progress. After the link object is successfully stored, a storage success message and a storage location of a stored document is displayed in the message prompt box.

The message prompt box herein, for example, is a Toast prompt box. The Toast prompt box is a modeless pop-up window that does not affect the user's operation and the user can make no respond to it. The modeless pop-up window has a time limit and will disappear automatically after a period of time. The Toast prompt box can be set at any position in the interface of the instant messaging conversation, such as at the top, middle, or bottom of the interface. The specific display position is set based on the overall design of the interface of the instant messaging conversation.

In some embodiments, after the link object is successfully stored, a state of the first storage control is changed from a storage state to a viewing state to obtain a viewing control. In this embodiment, the first storage control has two states; the storage state and the viewing state, different states corresponding to different icons. For example, an icon corresponding to the storage state is a sign pattern with the shape of scissors and an icon corresponding to the viewing state is a sign pattern with the shape of an eye.

In some embodiments, in response to a first triggering operation for the viewing control (e.g., clicking the left button of a mouse), the storage location of the first document containing the link object is jumped to and the first document is opened.

In some embodiments, in response to a second trigger operation for the viewing control(such as a mouse hovering over the viewing control), a prompt message for clicking to view the first document is displayed. The way to display the prompt information for clicking to view the first document is, for example, to pop up the message prompt box (such as the Toast prompt box) and prompt "Click to view the first document" in the message prompt box. The user clicks the viewing control to jump to the storage location of the first document and open the first document.

In some embodiments, after the storage of the linked object fails, a message prompt box (e.g., a Toast prompt box) displaying a storage failure message in the message prompt box pops up and the storage state of the first storage control is not changed. The user can trigger the first storage control once more for storage.

In some embodiments, after the link object is successfully stored, the first document is automatically opened by default. In some embodiments, the method for processing the link in the conversation further comprises: displaying a radio control in response to a second trigger operation for the first storage control(such as clicking the right button of a mouse), options of the radio control comprising an option to open a first document after the first document is stored and an option not to open the first document after the first document is stored; wherein the first document is a document containing the link object. The way to display the radio control herein is, for example, hover display. It can be seen that when the user selects the option to open a first document after the first document is stored, the first document is opened after the link object is successfully stored; and when the user selects option not to open the first document after the first document is stored, the first document is not opened after the link object is successfully stored.

In some embodiments, the message card further comprises a copying link control. The method for storing the link object further comprises in response to an operation triggering the copying link control, copying the link.

In some embodiments, the message card may further comprise a preview control, and the method for storing the link object further comprises in response to an operation triggering the preview control, displaying preview information for the link object of the link.

In some embodiments, the preview control is a first preview control. In response to an operation triggering the first preview control, the preview information is displayed in the message card in the interface of the instant messaging conversation. It can be seen that for the first preview control, the preview will not leave the interface of the instant messaging conversation, that is, it does not need to jump to an original page of the link and the user does not need to click on the link or a title to jump to the main body for viewing, making it more convenient for the user to understand more content. Even if the title or a part of the link content does not attract the user's attention, the user may still trigger the first preview control to view the preview information due to the existence of the first preview control, which increases the exposure of the link content.

In some embodiments, the first preview control is a scroll bar control in the message card. In response to a sliding operation for the scroll bar control, a part of the preview information is scrolled through in the message card in the interface of the instant messaging conversation.

In some embodiments, the first preview control is a view more control within the message card, such as a "view more" button. In response to a trigger operation for the view more control, the entire information of the preview information is displayed within the message card in the interface of the instant messaging conversation.

In some embodiments, the preview control is a second preview control. In response to an operation triggering the second preview control, a layer is popped up in the interface of the instant messaging conversation and the preview information is displayed in the popped-up layer. It can be seen that for the second preview control, the preview will not leave the interface of the instant messaging conversation, that is, it does not need to jump to an original page of the link and the user does not need to click on the link or a title to jump to the main body for viewing, making it more convenient for the user to understand more content. Even if the title or a part of the link content does not attract the user's attention, the user may still trigger the second preview control to view the preview information due to the existence of the second preview control, which increases the exposure of the link content.

In some embodiments, the second preview control is a "preview" button. In response to a click operation for the "preview" button, a layer, such as a mask layer, is popped up in the interface of the instant messaging conversation, and a scroll bar control or a view more control is added in the pop-up layer. In response to a sliding operation for the scroll bar control, a part of the preview information is scrolled through in the pop-up layer. Alternatively, in response to a trigger operation for the view more control, the entire information of the preview information is displayed within the pop-up layer. In addition, a close control, such as a "close" button, is added in the pop-up layer. In response to a click operation for the "close" button, the pop-up layer is closed.

In some embodiments, before displaying a message card containing information about the link in an interface of the instant messaging conversation, the method further comprises parsing the link to obtain the information about the link; and rendering the message card comprising the information about the link, the first storage control, and/or the preview control. When rendering the message card, the general height of the message card can be limited, and the general height can be set based on actual needs. This embodiment does not limit the specific value.

In some embodiments, the information about the link contained in the message card comprises at least one of: an icon, a hyperlink, and a tag. The icon herein is a sign pattern of a webpage corresponding to the link. The hyperlink is a text hyperlink, and the hyperlink opens a browser and jumps to a webpage corresponding to the link after being triggered. The tag is used to identify a type of a webpage corresponding to the link.

For example, if the web page corresponding to the link is a text document, the icon is the sign pattern of the text document; the hyperlink is the theme of the text document; and the tag is the identifier of the text document.

In some embodiments, the hyperlink can be constructed based on the theme or summary extracted from pages corresponding to the link, or the hyperlink can be constructed based on text customized by a business party. It can be seen that the hyperlink seen by the user is a text hyperlink, which makes it easier to understand the content summary of the webpage corresponding to the hyperlink.

In some embodiments, the icon is located before the hyperlink as the head of the hyperlink, and the tag is located after the hyperlink as the end of the hyperlink. Therefore, the icon, hyperlink, and tag can be regarded as a whole as the result of the link parse. It can be seen that one of the differences from existing message cards is that the message card in this embodiment comprises the result of the link parse, not the link itself.

In some embodiments of the present disclosure, the method for processing the link in the conversation is executed in cooperation between an IM Client and a URL middle platform. The URL middle platform can be understood as a service middle platform in the IM system that handles URL-related matters. The URL middle platform obtains user input through the IM Client and displays processing results of the URL to the user through the IM Client.

FIG. 2 is an example flowchart of another method for processing a link in a conversation provided in an embodiment of the present disclosure. The information display method comprises steps 201 to 206.

In step 201, a user sends a message containing a link to an instant messaging conversation.

In step 202, a URL middle platform determines whether the link is an external text-based link in respond to sending the message containing the link to the instant messaging conversation. The external text-based link is a link with text as a main content, such as a content platform link, a forum link, an official account link, a news web page link, etc. The external link herein can be understood as a link external to an IM tool.

In step 203, in accordance with a determination that the URL middle platform determines the link is not an external text-based link, an existing online logic is used to process the link, wherein there can be a plurality of online logics. A current online logic is to directly display the link in an interface of the instant messaging conversation, and other online logics will not be repeated.

In step 204, in accordance with a determination that the URL middle platform determines the link is an external text-based link, a message card containing information about the link and a first storage control is displayed in the interface of the instant messaging conversation in response to sending a message containing a link to an instant messaging conversation.

In step 205, the user can trigger the first storage control. For example, the user clicks on the first storage control with the left button of a mouse.

In step 206, the URL middle platform stores a link object of the link in response to a first trigger operation (such as clicking the left button of a mouse) for the first storage control.

While the URL middle platform is storing the link object of the link, a Toast prompt box is popped up, in which "being stored . . . X %" is displayed, wherein X is any positive number between 0 and 100, and X is dynamically updated with storage progress.

The URL middle platform determines whether the storage is successful. If the storage fails, "storage failed" will be displayed in the Toast prompt box. If the storage is successful, "display storage, you can go to my space to view" will be displayed in the Toast prompt box, wherein my space is a storage location of a first document.

When the URL middle platform performs the storage successfully, it changes the state of the first storage control from a storage state to a viewing state to obtain a viewing control. When the user's mouse hovers over the viewing control, the URL middle platform pops up the Toast prompt box and prompts "click to view the first document" in the Toast prompt box. When the user clicks the viewing control, the storage location of the first document is jumped to, and the URL middle platform opens the first document for the user to view.

Figure 3:
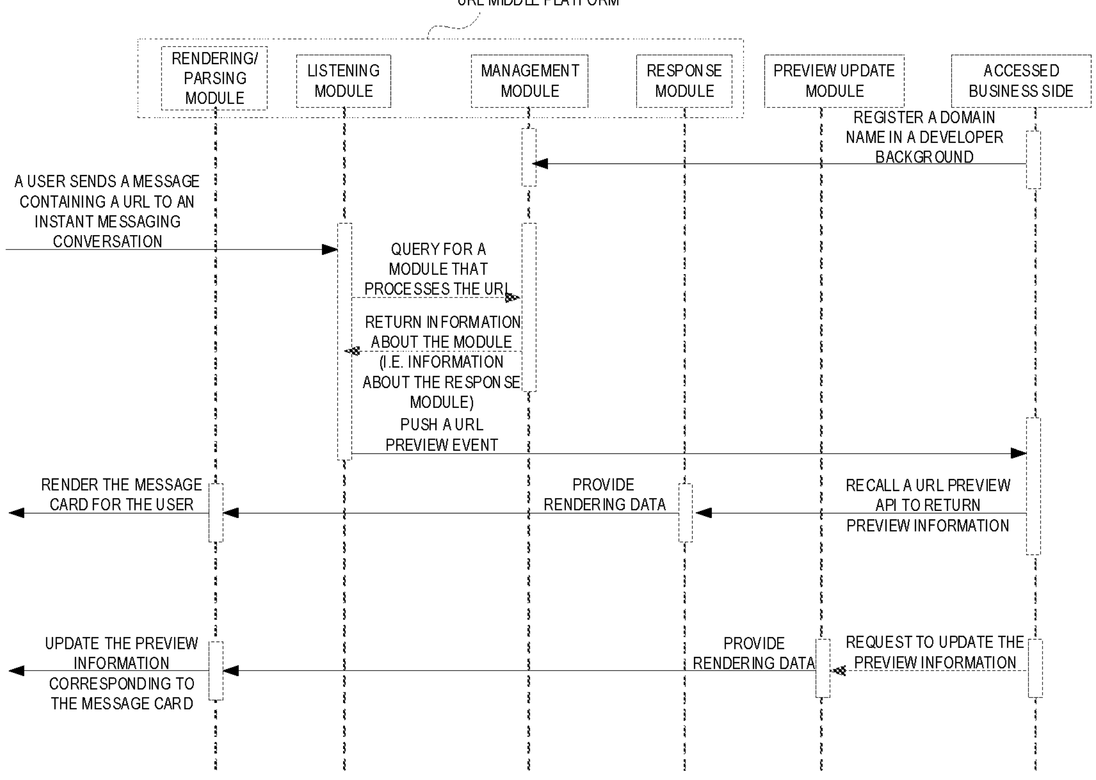
FIG. 3 is an example flowchart of a method for information display provided in an embodiment of the present disclosure.

FIG. 3 is an example flowchart of a method for information display provided in an embodiment of the present disclosure. The execution subject of the method for information display is a URL middle platform. Furthermore, a URL middle platform is divided into a plurality of functional modules; a rendering/parsing module, a listening module, a management module, and a response module. In FIG. 3, a business side needs to register a domain name in a developer background first in order to access the management module of the URL middle platform. The process of the method for information display is described as follows:

A user sends a message containing a URL to an instant messaging conversation. After listening to the message containing the URL, the listening module queries the management module for a module that processes the URL. The management module returns information about the queried module (i.e., information about the response module) to the listening module. The listening module pushes a URL preview event to the business side of the URL. The business side, in respond to the URL preview event, recalls a URL preview API (Application Programming Interface) to obtain a preview information and sends the preview information to the response module. The response module receives the preview information fed back by the business side in response to the URL preview event and provides rendering data to the rendering/parsing module, which comprises but not limited to the height of a message card. After obtaining the rendering data, the rendering/parsing module parses the URL, obtains information about the link, and renders the message card comprising the information about the link and a preview control for the user.

In addition, the accessed business side can also request the preview update module to update the preview information, and send new preview information to the preview update module while requesting to update the preview information. The preview update module generates rendering data based on the new preview information and sends the rendering data to the rendering/parsing module. After obtaining the rendering data, the rendering/parsing module updates the preview information corresponding to the message card.

It should be noted that for the above-mentioned method embodiments, they are all described as a series of action combinations for simplicity. However, those skilled in the art can understand that the embodiments of the present disclosure are not limited by the action sequence described, because according to the embodiments of the present disclosure, some steps can be performed in other sequences or simultaneously. In addition, those skilled in the art can understand that the embodiments described in the specification are all optional embodiments.

Figure 4:
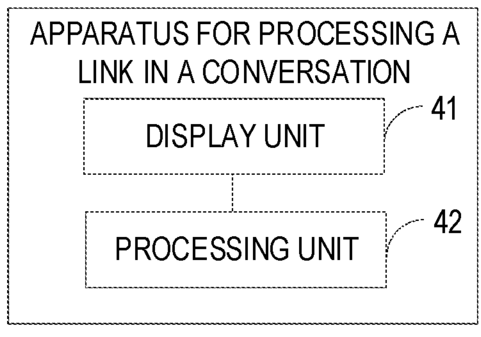
FIG. 4 is an example block diagram of an apparatus for processing a link in a conversation provided in an embodiment of the present disclosure.

FIG. 4 is an apparatus for processing a link in a conversation provided in an embodiment of the present disclosure. The apparatus for processing a link in a conversation comprises but is not limited to a display unit 41 and a processing unit 42.

The display unit 41 is configured to display, in response to sending a message containing a link to an instant messaging conversation, a message card containing information about the link in an interface of the instant messaging conversation, the message card comprising a first storage control; and the processing unit 42 is configured to store a link object corresponding to the link in response to a first trigger operation for the first storage control.

In some embodiments, the processing unit 42 storing a link object corresponding to the link comprises: saving a first document containing the link object to a first storage directory or a root directory of a predetermined storage space.

In some embodiments, the predetermined storage space is a storage space used to save a cloud file in an instant messaging tool; wherein there is an entrance to access the predetermined storage space in a user interface of an instant messaging tool.

In some embodiments, the processing unit 42 is further configured to pop up a message prompt box and display storage progress information in the message prompt box while the link object is being stored; and display a storage success message and a storage location of a stored document in the message prompt box after the link object is successfully stored.

In some embodiments, the processing unit 42 is further configured to change a state of the first storage control from a storage state to a viewing state to obtain a viewing control after the link object is successfully stored; and in response to a first trigger operation for the viewing control, jump to a storage location of a first document containing the link object and open the first document; and/or in response to a second trigger operation for the viewing control, display a prompt message for clicking to view the first document.

In some embodiments, the processing unit 42 is further configured to display a radio control in response to a second trigger operation for the first storage control, options of the radio control comprising an option to open a first document after the first document is stored and an option not to open the first document after the first document is stored, wherein the first document is a document containing the link object.

In some embodiments, the message card further comprises a copying link control and/or a preview control; the processing unit 42 is further configured to copy the link in response to an operation triggering the copying link control; and/or display preview information for the link object of the link in response to an operation triggering the preview control.

In some embodiments, the preview control is a first preview control or a second preview control; the processing unit 42 displays the preview information in the message card in the interface of the instant messaging conversation in response to an operation triggering the first preview control; or pops up a layer in the interface of the instant messaging conversation and displays the preview information in the popped-up layer in response to an operation triggering the second preview control.

In some embodiments, the information about the link contained in the message card comprises at least one of an icon that is a sign pattern of a webpage corresponding to the link; a hyperlink that opens a browser and jumps to a webpage corresponding to the link after being triggered; or a tag used to identify a type of a webpage corresponding to the link.

In some embodiments, the apparatus for processing a link in a conversation further comprises a parsing/rendering unit configured to parse the link to obtain the information about the link; and render the message card comprising the information about the link and the first storage control. After the parsing/rendering unit renders the message card, the display unit 41 displays the message card containing the information about the link in the interface of the instant messaging conversation.

In some embodiments, the division of each unit in the apparatus for processing a link in a conversation is only a logical functional division, and there can be other division methods in actual implementation. For example, at least two units in the apparatus for processing a link in a conversation can be implemented as one unit; each unit in the apparatus for processing a link in a conversation can also be divided into a plurality of sub-units. It can be understood that each unit or sub-unit can be implemented by electronic hardware, or a combination of computer software and electronic hardware. Whether these functions are performed in hardware or software depends on the specific application and design constraints of the technical solution. Those skilled in the art can use different methods for each specific application to achieve the described functions.

Figure 5:
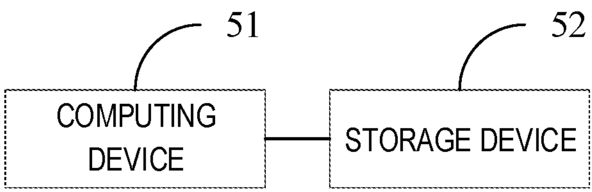
FIG. 5 is an example block diagram of a system comprising at least one computing device and at least one storage device for storing instructions provided in an embodiment of the present disclosure.

FIG. 5 is an example block diagram of a system comprising at least one computing device and at least one storage device for storing instructions provided in an embodiment of the present disclosure. In some embodiments, the system may be used for big data processing, and at least one computing device and at least one storage device may be distributed deployment, making the system a distributed data processing cluster.

As shown in FIG. 5, the system comprises; at least one computing device 51, and at least one storage device 52 that stores instructions. It can be understood that the storage device 52 in this embodiment can be volatile memory or non-volatile memory, or can comprise both volatile and non-volatile memory.

In some embodiments, storage device 52 stores the following elements, executable units or data structures, or subsets of them, or extended sets of them: operating systems and applications.

The operating system herein comprises various system programs, such as framework layer, core library layer, driver layer, etc., for implementing various basic tasks and processing hardware-based tasks. The application program comprises various applications, such as media players and browsers, for implementing various application tasks. The program that implements the method for processing a link in a conversation provided in the embodiments of the present disclosure can be comprised in the application program.

In the embodiments of the present disclosure, the at least one computing device 51 recalls a program or instruction stored in the at least one storage device 52, specifically a program or instruction stored in an application program. The at least one computing device 51 is used to execute the steps of the embodiments of the method for processing a link in a conversation provided in the embodiments of the present disclosure.

The method for processing a link in a conversation provided in the embodiment of the present disclosure can be applied to the computing device 51 or implemented by the computing device 51. The computing device 51 can be an integrated circuit chip with signal processing capability. In the implementation process, each step of the above method can be completed by the integrated logic circuit of the hardware or instructions in the form of software in the computing device 51. The computing device 51 can be a general-purpose processor, a Digital Signal Processor (DSP), an Application Specific Integrated Circuit (ASIC), a Field Programmable Gate Array (FPGA) or other programmable logic devices, discrete gate or transistor logic devices, discrete hardware components. The general-purpose processor can be a microprocessor or the processor can also be any conventional processor, etc.

The method for processing a link in a conversation provided in the embodiment of the present disclosure can be directly embodied as hardware decoding processor execution is completed, or executed by a combination of hardware and software units in the decoding processor. The software unit can be located in a random-access memory, flash memory, read-only memory, programmable read-only memory, or electrically erasable programmable memory, registers, and other mature storage media in the art. The storage medium is in the storage device 52, and the computing device 51 reads the information in the storage device 52 and performs the steps of the method in combination with the hardware completion.

The embodiment of the present disclosure also proposes a computer-readable storage medium, wherein the computer-readable storage medium stores programs or instructions that, when executed by at least one computing device, cause the at least one computing device to perform the steps of the embodiments of the method for processing a link in a conversation, which will not be repeated herein to avoid repeated description. The computing device herein may be the computing device 51 shown in FIG. 5. In some embodiments, the computer-readable storage medium is a non-transitory computer-readable storage medium.

The disclosed embodiment also proposes a computer program product, wherein the computer program product comprises a computer program stored in a non-transitory computer-readable storage medium, and at least one processor of the computer reads the computer program from the storage medium and executes the computer program, causing the computer to perform the steps of the embodiments of the method for processing a link in a conversation, which is not repeated to avoid repeated description, which will not be repeated herein to avoid repeated description.

It should be noted that the terms "including", "comprising", or any other variation thereof herein are intended to cover non-exclusive inclusion, so that a process, method, article, or device that comprises a series of elements not only comprises those elements, but also comprises other elements not explicitly listed, or comprises elements inherent to such a process, method, article, or device. Without further restrictions, the elements defined by the phrase "comprising . . . " do not exclude the existence of other identical elements in the process, method, article, or device that comprises the element.

The ordinary skilled in the art can understand that although some of the embodiments described herein comprise certain features comprised in other embodiments rather than other features, the combination of features of different embodiments means that they are within the scope of this disclosure and form different embodiments.

The ordinary skilled in the art can understand that the description of each implementation example has its own emphasis, and the parts that are not described in detail in a certain implementation example can refer to the relevant descriptions of other implementation examples.

Although the implements of the present disclosure are described in conjunction with the accompanying drawings, those skilled in the art can make various modifications and variations without departing from the spirit and scope of the present disclosure, and such modifications and variations fall within the scope defined by the appended claims.

We claim:

1. A method for processing a link in a conversation, the method comprising:

in response to sending a message containing a link to an instant messaging conversation, displaying a message card containing information about the link in an interface of the instant messaging conversation, the message card comprising a first storage control;

in response to a first trigger operation for the first storage control, storing a link object corresponding to the link;

displaying storage progress information about the link object while the link object is being stored;

after the link object is successfully stored, changing a state of the first storage control from a storage state to a viewing state to obtain a viewing control; and in response to a first trigger operation for the viewing control, opening the first document.

2. The method of claim 1, wherein storing a link object corresponding to the link comprises:

saving the first document containing the link object to a first storage directory or a root directory of a predetermined storage space.

3. The method of claim 2, wherein, the predetermined storage space is a storage space used to save a cloud file in an instant messaging tool; wherein there is an entrance to access the predetermined storage space in a user interface of an instant messaging tool.

4. The method of claim 1, wherein displaying the storage progress information comprises:

popping up a message prompt box and displaying the storage progress information in the message prompt box while the link object is being stored; and wherein the method further comprises:

displaying a storage success message and a storage location of the first document in the message prompt box after the link object is successfully stored.

5. The method of claim 1, wherein the method further comprises:

in response to a second trigger operation for the viewing control, displaying a prompt message for clicking to view the first document.

6. The method of claim 1, wherein the method further comprises:

displaying a radio control in response to a second trigger operation for the first storage control, options of the radio control comprising an option to open a first document after the first document is stored and an option not to open the first document after the first document is stored; wherein the first document is a document containing the link object.

7. The method of claim 1, wherein the message card further comprises a copying link control and/or a preview control;

the method further comprises:

in response to an operation triggering the copying link control, copying the link; and/or in response to an operation triggering the preview control, displaying preview information for the link object of the link.

8. The method of claim 7, wherein the preview control is a first preview control or a second preview control;

in response to an operation triggering the preview control, displaying preview information for the link object of the link comprises:

in response to an operation triggering the first preview control, displaying the preview information in the message card in the interface of the instant messaging conversation; or in response to an operation triggering the second preview control, popping up a layer in the interface of the instant messaging conversation and displaying the preview information in the popped-up layer.

9. The method of claim 1, wherein the information about the link contained in the message card comprises at least one of:

an icon that is a sign pattern of a webpage corresponding to the link;

a hyperlink that opens a browser and jumps to a webpage corresponding to the link after being triggered; or a tag used to identify a type of a webpage corresponding to the link.

10. The method of claim 9, wherein before displaying a message card containing information about the link in an interface of the instant messaging conversation, the method further comprises:

parsing the link to obtain the information about the link; and rendering the message card comprising the information about the link and the first storage control.

11. A system comprising at least one computing device and at least one storage device storing instructions, wherein the instructions, when executed by the at least one computing device, cause the at least one computing device to perform acts comprising:

in response to sending a message containing a link to an instant messaging conversation, displaying a message card containing information about the link in an interface of the instant messaging conversation, the message card comprising a first storage control;

in response to a first trigger operation for the first storage control, storing a link object corresponding to the link;

displaying storage progress information about the link object while the link object is being stored;

after the link object is successfully stored, changing a state of the first storage control from a storage state to a viewing state to obtain a viewing control; and in response to a first trigger operation for the viewing control, opening the first document.

12. The system of claim 11, wherein storing a link object corresponding to the link comprises:

saving the first document containing the link object to a first storage directory or a root directory of a predetermined storage space.

13. The system of claim 12, wherein, the predetermined storage space is a storage space used to save a cloud file in an instant messaging tool; wherein there is an entrance to access the predetermined storage space in a user interface of an instant messaging tool.

14. The system of claim 11, wherein displaying the storage progress information comprises:

popping up a message prompt box and displaying the storage progress information in the message prompt box while the link object is being stored; and wherein the method further comprises:

displaying a storage success message and a storage location of the first document in the message prompt box after the link object is successfully stored.

15. The system of claim 11, wherein the acts further comprise:

in response to a second trigger operation for the viewing control, displaying a prompt message for clicking to view the first document.

16. The system of claim 11, wherein the acts further comprise:

displaying a radio control in response to a second trigger operation for the first storage control, options of the radio control comprising an option to open a first document after the first document is stored and an option not to open the first document after the first document is stored; wherein the first document is a document containing the link object.

17. The system of claim 11, wherein the message card further comprises a copying link control and/or a preview control;

the acts further comprise:

in response to an operation triggering the copying link control, copying the link; and/or in response to an operation triggering the preview control, displaying preview information for the link object of the link.

18. The system of claim 17, wherein the preview control is a first preview control or a second preview control;

in response to an operation triggering the preview control, displaying preview information for the link object of the link comprises:

in response to an operation triggering the first preview control, displaying the preview information in the message card in the interface of the instant messaging conversation; or in response to an operation triggering the second preview control, popping up a layer in the interface of the instant messaging conversation and displaying the preview information in the popped-up layer.

19. The system of claim 11, wherein the information about the link contained in the message card comprises at least one of:

an icon that is a sign pattern of a webpage corresponding to the link;

a hyperlink that opens a browser and jumps to a webpage corresponding to the link after being triggered; or a tag used to identify a type of a webpage corresponding to the link.

20. A non-transitory computer-readable storage medium, wherein the computer-readable storage medium stores programs or instructions that, when executed by at least one computing device, cause the at least one computing device to perform acts comprising:

in response to sending a message containing a link to an instant messaging conversation, displaying a message card containing information about the link in an interface of the instant messaging conversation, the message card comprising a first storage control;

in response to a first trigger operation for the first storage control, storing a link object corresponding to the link;

displaying storage progress information about the link object while the link object is being stored;

after the link object is successfully stored, changing a state of the first storage control from a storage state to a viewing state to obtain a viewing control; and in response to a first trigger operation for the viewing control, opening the first document.

* * * * *